May 19, 1964

G. L. HAYWOOD 3,133,801

FLEXIBLE COATED ABRASIVES

Filed April 6, 1962

INVENTOR
GEORGE L. HAYWOOD

BY *Hugh E. Smith*

ATTORNEY

May 19, 1964

G. L. HAYWOOD 3,133,801

FLEXIBLE COATED ABRASIVES

Filed April 6, 1962

INVENTOR
GEORGE L. HAYWOOD

BY *Hugh E. Smith*

ATTORNEY

United States Patent Office 3,133,801
Patented May 19, 1964

3,133,801
FLEXIBLE COATED ABRASIVES
George L. Haywood, Latham, N.Y., assignor to Norton
Company, Troy, N.Y., a corporation of Massachusetts
Filed Apr. 6, 1962, Ser. No. 185,763
5 Claims. (Cl. 51—293)

My invention relates to the manufacture of improved coated abrasives. In particular, I have discovered a new flexed coated abrasive product of improved properties and a method for making such an improved product. This application forms a continuation-in-part of my copending application, Serial No. 731,006, filed April 25, 1958, and now abandoned.

In the manufacture of coated abrasives, a specially prepared backing such as paper, cloth, a laminate of paper and cloth, or other suitable sheet material is coated with an adhesive binder in an uncured or liquid state, abrasive grain is applied, and the adhesive binder is cured, or in the case of glue, dried. Addtional coatings of a "sizing" adhesive binder are usually applied after the application of the abrasive grain onto the first or "maker" coat to insure a durable, well bonded product.

The adhesive binders used in the manufacture of coated abrasive must produce a strong bond with the backing and must firmly anchor the individual abrasive grains in place. Many such binders as are satisfactory for this purpose produce a relatively hard film of binder. Most, if not all, of the compositions suitable for bonding the grain to the backing of a coated abrasive have as might be expected some degree of stiffness when set up in the cured or hardened condition. Such stiffness detracts from the utility of the product when flexibility is required or desirable.

It is therefore a common practice in the coated abrasive art to increase the flexibility of such products by a mechanical flexing operation which results in a plurality of actual fractures in the composite sheet. Such breaking or fracture may be produced either as the material is flexed in actual abrading operations (with danger of damage to the material being abraded,) or preferably by a more or less controlled flexing operation prior to the use of the product. In the past, such flexing operations prior to use of the product have been particularly applied to products made with relatively hard and tough binders which would be unsuitable for many applications in the absence of such a flexing operation.

In any such flexing operation the fracture of the relatively stiff component of the composite must be controlled to avoid excessive fracture resulting in a deterioration of the adhesion of the bonding coat to the backing or a loosening of the abrasive grits.

Even when relatively soft or rubbery binders are used, the problem of optimum flexibility with maximum cutting efficiency still exists and requires a flexing method that can be changed in its degree to allow the maintenance of a control similar to the control desirable in flexing materials having binders of a relatively hard and tough nature.

The range of variation in the nature of binders used in coated abrasives, from soft and elastomeric to hard and brittle or hard and tough requires a very wide variability in the overall degree of flex and can only be maintained in the range of optimum flexibility and maximum durability or cutting efficiency by a uniform flexing method that will encompass the coated abrasive product in all directions by a controlled process.

A common method for flexing coated abrasives in the past has been to draw the non-abrasive side of the material across a small diameter rod or bar oriented at 90° to the machine direction of the web in the case of paper backings, or 90° to the warp direction in the case of woven backings. Where additional flexing was desired, the material was also drawn over two additional rods set at angles of +45° and —45° to the 90° rod.

Additional flexing methods attempted in the past have involved the use of stationary balls over which the non-abrasive side of the web is passed while pressure is applied and also the use of rotating helically wound bars over which the non-abrasive side of the web is drawn under pressure. In the first of these additional methods, a unidirectional flex tends to be produced since the primary flex paths are parallel. The helical bar method, while producing intersecting primary flex paths appears to produce a plurality of small cracks in the coating at right angles to the primary flex path and in the nature of the pattern produced by a bar flex. Neither of these methods illustrated by U.S. Patents Nos. 1,989,742 and 1,238,143 give a uniformly flexed sheet. These and the other methods described above produce either a product of non-uniform flexibility or a product wherein the adhesion between the backing, grain and adhesive bonding coat is so severely degraded that the durability of the product is seriously affected.

I have found that the defects of the prior flexing methods can be overcome, and a product having properties qualitatively different from the flexed products of the prior art can be produced by the use of my invention.

It is, therefore, an object of my invention to provide an improved flexible coated abrasive product.

It is a further object of my invention to provide a method for producing a coated abrasive of improved flexibility.

Various illustrative methods of producing the product of my invention are illustrated in the accompanying drawings and utilize a plurality of pressure-applying members moving transversely to the direction of movement of the abrasive coated web.

The coated abrasive product of my invention is a uniformly flexed material of unusually good durability. The product can be described as having a plurality of primary flex paths running over the entire area of the abrasive web and at various angles to the length and cross axes of the web.

By "primary flex path" I mean the course followed by any ball, series of balls, or other rolling pressure members causing fracture in the grit bonding coat-backing composite along the path of the moving member and in such a manner as to approach the flexibility of the original backing sheet or web. The actual fractures or secondary flex lines in the grit bonding coat-backing composite, of course, radiate from the primary flex path in a pattern resembling the venation of a leaf or the frond structure of a fern, i.e. the cracks radiate out ahead of the rolling pressure members in a herringbone like fashion illustrated in FIGURE 7 of the drawings, and are of a length determined, among other things, by the brittleness of the bond, the shape, size and pressure of the moving member and the hardness of the surface supporting the coated abrasive web. Each "primary flex path" can thus be thought of as a locus of points from which radiate the actual fractures of the bond.

Figure 1:
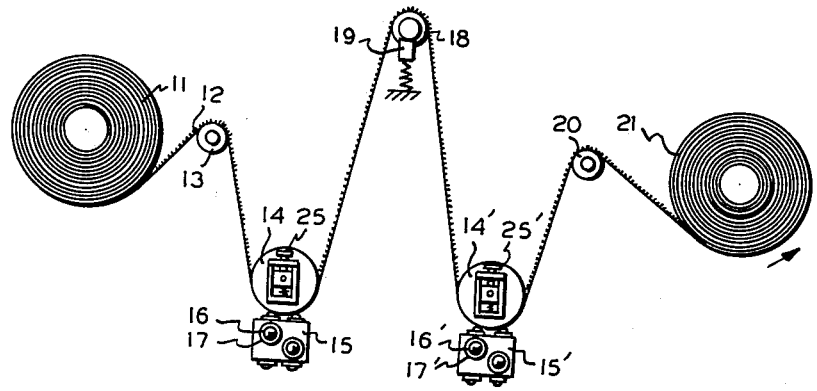
FIGURE 1 illustrates a schematic plan view of a device for carrying out my invention.

Referring more specifically to FIGURE 1, this figure shows a schematic plan of an apparatus designed to produce the improved flexed product of my invention. In operation, a roll of coated abrasive to be flexed by the apparatus is mounted as indicated at 11. From this roll 11, the coated abrasive sheet 12 passes over a guide roll 13, under a first positively driven rubber roll 14 (abrasive coated side toward roll 14) against which it is forced by a belt flexing unit 15. Mounted on the belt 15 are a plurality of evenly spaced balls 16 mounted for free rotation in a support member 17. The ball and support member 17 may be, for example, a conventional ball-caster unit, but should be durable and precisely machined.

After passing from the first flexing unit 15, the web passes over a second guide roll 18, which may be spring loaded as shown at 19, to a second flexing unit combining a belt 15′, a driven backing roll 14′ and ball-caster units 16′, 17′.

From the second flexing unit the web passes over a third guide roll 20 to be wound into the finished roll 21. The windup roll 21 is, like rolls 14 and 14′, positively driven.

The flexing units comprising the belt 15, ball units 16, 17 and backing roll 14, belt 15′, ball units 16′, 17′, and the backing roll 14′ are identical. In operation, however, the belts 15 and 15′ are driven in opposite directions with respect to each other.

The backing rolls 14, 14′ are each provided with vertically adjustable bearing means 25 and 25′ to provide control of the pressure applied to the moving web passing between the ball-belt units and the backing rolls.

Figure 2:
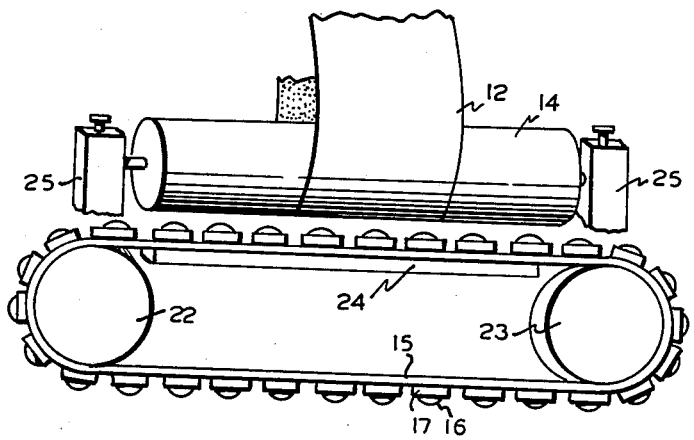
FIGURE 2 is a partly schematic view of a part of the apparatus of FIGURE 1 as viewed from one end of FIGURE 1.

As is more clearly illustrated in FIGURE 2 which shows a side view of an individual flexing unit, the belt 15 passes over and is supported by wheel members 22 and 23, one of which is positively driven by a conventional motor means (not shown). In addition, the belt is supported by platen 24 positioned under the axis of backing roll 14. As illustrated, the backing roll 14 and the ball units 16, 17 are shown separated. In operation, of course, the adjusting means 25 would be set to produce the desired degree of pressure between the balls 16 and the web 12.

As is apparent from the above description, the coated abrasive web moving through the apparatus is subjected first to the pressure of balls 16 moving across the web in one direction and then to the pressure of balls 16′ moving across the web in the opposite direction. The type of pattern of ball paths produced across the web is thus illustrated in FIGURE 4, the dotted lines 116 representing the paths of the balls 16 and the dotted lines 117 representing the paths of the balls 16′.

Figure 3:
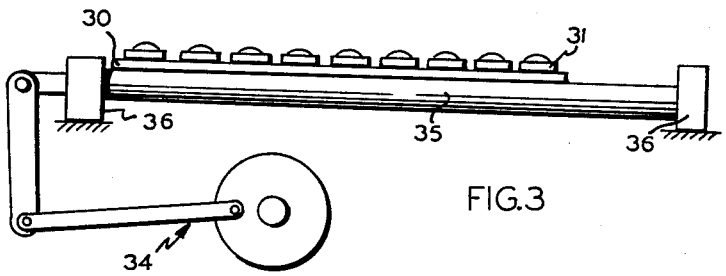
FIGURE 3 is a partly schematic view similar to FIGURE 2, of a modification of the device of FIGURE 2.

FIGURE 3 represents a different apparatus for producing the novel product of my invention. Instead of using the belt flexing units of FIGURES 1 and 2, I may use a single oscillating unit as shown somewhat schematically in FIGURE 3. The unit comprises a rigid plate member 30 upon which are mounted at least two rows of evenly spaced ball-caster units 31, the units 31 of FIGURE 3 being identical to the units 16, 17 of FIGURES 1 and 2. The plate 30 is supported for reciprocating movement on frame 35 which is supported in bearings 36 and given an oscillatory motion by a crank unit schematically shown at 34, suitably driven by conventional motor means (not shown).

In operation, the oscillating flexing unit of FIGURE 3 may be substituted for the two belt flexing units of FIGURES 1 and 2, the coated abrasive being flexed between the ball units 31 of FIGURE 3 and a backing roll such as illustrated at 14 in FIGURE 1. By use of the unit of FIGURE 3, a symmetrical flex comparable to that produced by the apparatus of FIGURES 1 and 2 may be produced by one pass through a single ball flexing unit.

Figure 5:
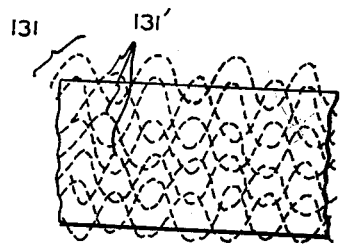
FIGURE 5 is a representation of a sheet of coated abrasive showing in dotted lines the primary flex paths traversed by the apparatus of FIGURE 3.

FIGURE 5 shows an example of the pattern traced across the coated abrasive by means of the unit of FIGURE 3. The sine waves indicated by dotted lines 131 being produced by one row of ball-caster units 31 and the sine waves 131′, out of phase with the first set of sine waves 131, being produced by the second parallel row of balls. Obviously, the amplitude, phase relation, and spacing of the flex paths can be varied by variation of the relative speeds of oscillation of the flexer and the travel of the web, and by variation in the spacing and number of ball units.

A wide variety of types of finished product may be produced by the methods of my invention. As will be apparent from the above description, I can exercise a large degree of control over the properties of the final flex by control of such factors as the size and spacing of the ball units, the pressure with which the ball units are applied to the abrasive web, the hardness of the backing rolls 14, the absolute speed of travel of the ball units across the moving web, and the relative speeds of the web and the ball units.

In general, with respect to the pressure applied to the web by the ball units, I find that adjustment of the pressure is most conveniently made by backing the rolls 14 and 14′ a predetermined distance away from the flexing balls from an initial position in which, with no abrasive web in the apparatus, the balls and the roll just touch. The exact adjustment of the pressure will, of course, depend upon the hardness of the backing roll, the properties of the material being flexed, and the desired degree of flex in the finished product. Since the web is supported over a backing roll which would theoretically give line contact and is contacted with the rolling curved surface of the flexing balls which would theoretically meet the web with a point contact, it is apparent from the foregoing description and drawings that the contact between the balls and the web is substantially tangential to the surface of the balls.

The speeds of the belt devices of FIGURES 1 and 2 and of the oscillating device of FIGURE 3 are variable over wide limits. I have found that the speed and spacing of the balls should be such that when one inch diameter balls are spaced in staggered relation in a double row, with centers about two and one half inches apart, a speed of around 500 to 600 feet a minute for the belt units and 50 to 100 feet a minute for the web speed produces satisfactory results, although wide variations in these speeds may be made. In general, with either the units of FIGURES 1 and 2 or the unit of FIGURE 3, the arrangement and speed should be adjusted so that the width of the secondary flex areas produced by any given ball is approximately equal to or greater than the average spacing between adjacent primary flex paths. By "secondary flex areas" I mean the actual flexed area produced by travel of the balls over the "primary flex paths." The width of such secondary flex areas for any given ball diameter and speed, for a given web speed and ball pressure, may be readily determined by trial and inspection for any given product.

Figure 4:
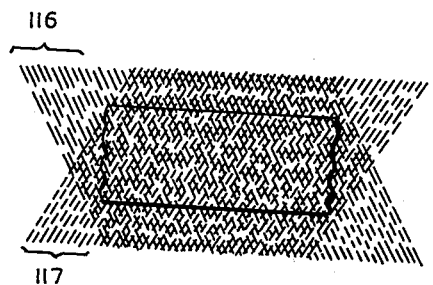
FIGURE 4 is a representation of a sheet of coated abrasive showing in dotted lines the primary flex paths traversed by the apparatus of FIGURE 1.
Figure 7:
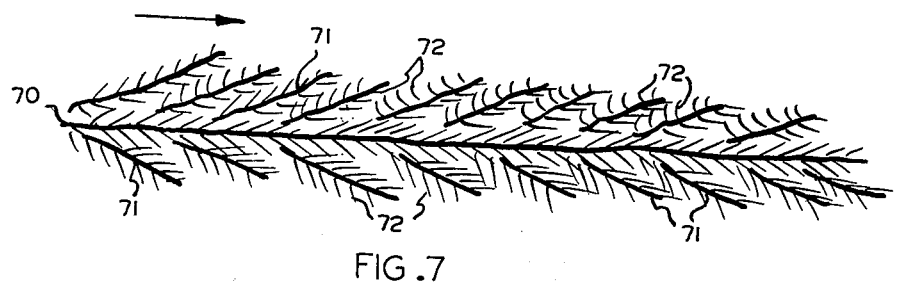
FIGURE 7 is a schematic illustration of a portion of a primary flex path illustrating the secondary flex pattern radiating therefrom.

An illustration of the "secondary flex area" mentioned above is shown schematically in FIGURE 7. It will be seen that the secondary flex lines 71 radiate out from the primary flex path 70 in a fern-like pattern. Minute random cracks 72 interconnect these secondary flex lines as shown. The direction of movement of the rolling curved pressure member used to form such pattern is as shown by the arrow. In actual practice the next adjacent parallel primary flex paths will be no further distant from the path 70 illustrated than the lateral distance "a" to the end of the secondary flex lines 71. This gives the desired overlap of secondary flex lines and when combined with the second set of primary flex paths intersecting the first set at an angle as illustrated in FIGURES 4 and 5, the resulting pattern produces the desired uniform flex in the finished product.

As an example of the operation of my invention, I have treated a cloth backed, 24 grit aluminum oxide, resin bonded coated abrasive typical of products of the prior art with an apparatus such as illustrated in FIGURES 1 and 2. Travelling ball units in which one inch diameter balls staggered in a double row with centers about two and one half inches apart travelled at a linear speed of 600 feet per minute against the abrasive web travelling at 63 feet per minute, produced a coated abrasive of superior flexibility combined with superior cutting efficiency as compared with the identical product flexed by known methods of the prior art.

Although the example I have given refers to a cloth backed coated abrasive, my invention in general is applicable to any coated abrasive having a relatively flexible backing material. The latitude in control of the production of my novel flex permits me to tailor-make a given product with the particular degree of flexibility most suited to the intended end use of the product. The controlled flexibility thus produced by my invention has, to my knowledge, been hitherto unobtainable by methods of the prior art.

Although I have illustrated balls as the flexing instruments in FIGURES 1, 2 and 3, I may use other instrumentalities such as rollers for producing the stresses and resulting fractures in the coated abrasive materials to be flexed. Also, the balls illustrated in the drawing may, instead of being freely rotating, rotate upon a single fixed axis which may be angularly adjustable if desired. Where a device such as illustrated in FIGURES 1 and 2 is utilized a plurality of rollers or balls rotating on single fixed axes would be particularly suitable since rolling contact without slippage would be maintained at any given relative rate of travel of the belt 15 and the web 12 by proper adjustment of the orientation of each axis perpendicular to the primary flex path.

Figure 6:
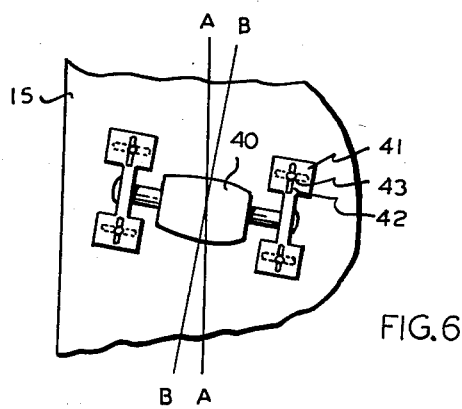
FIGURE 6 is a fragmentary view of a portion of the apparatus employing rollers instead of balls.

In FIGURE 6 is illustrated a portion of a belt 15 having roller members, as described above, substituted for the ball units of FIGURES 1 and 2. The roller, indicated at 40 is supported for rotation in bearings 41 adjustably mounted on the belt 15 by fastening means indicated at 43. As illustrated, slots 42 in the belt and in the bearing mount are arranged at right angles to permit adjustment of the bearing relative to the direction of travel of the belt 15. Thus the roller member 40 may be supported at any desired angle away from the line A—A which represents the direction of travel of the belt 15. The angle is, of course, preferably adjusted so that the line B—B corresponds to the primary flex path for each roller 40 at a given adjustment of belt and web speeds.

I claim:

1. A method of flexing coated abrasives which comprises: applying an abrasive bond fracturing pressure to the back surface of a web having on its opposite surface a layer of abrasive grains adhesively bonded thereto, said pressure being applied along a set of substantially straight narrow paths by substantially tangential contact with a first set of rolling curved pressure applying members which move in contact with and entirely across said web at an acute angle to its length direction; and thereafter applying a further abrasive bond fracturing pressure to the back surface of said web along substantially straight narrow paths intersecting said first set of paths by contacting said web in a substantially tangential fashion with rolling curved pressure applying members moving in contact with and entirely across said web in the opposite direction to said first set of members.

2. A method of flexing coated abrasives which comprises: forming a first series of parallel fracture patterns extending across a coated abrasive sheet at an acute angle to its length direction, said fracture patterns each consisting of a plurality of closely adjacent fern-like cracks radiating in herringbone fashion from a path which is the locii of a rolling point contact, each of said parallel fracture patterns being so disposed as to at least partially overlap the fracture patterns on each side thereof; forming a second series of substantially identical parallel fracture patterns extending across said coated abrasive sheet at an intersecting angle with said first series; and continuing to form said alternate sets until the entire surface of said coated abrasive sheet has been uniformly flexed.

3. A uniformly flexible coated abrasive comprising: a flexible backing sheet; at least one bonding coat of adhesive on said backing sheet; and a plurality of abrasive grains firmly affixed to said backing sheet by said bonding coat, said bonding coat being fractured along lines radiating in fern-like patterns from non-parallel sets of straight line primary flex paths which are the locii of rolling point contacts, said primary flex paths extending at an angle to the length direction of said sheet and across said sheet and the paths in each set of primary flex paths being parallel to one another and so spaced one from the other as to have the fern-like fracture patterns of each path at least partially overlap the next adjacent fracture patterns.

4. A uniformly flexed coated abrasive product which comprises: a flexible backing member; a layer of abrasive grain; and at least one co-extensive layer of bonding adhesive securely adhering said grain to said backing member; said bonding adhesive having therein a first set of parallel fracture patterns extending across the width of said member at an acute angle to the length direction thereof, said fracture patterns each consisting of a plurality of closely adjacent fern-like cracks radiating in herringbone fashion from a path which is the locii of a rolling point contact, each of said parallel fracture patterns being so disposed as to at least partially overlap the fracture patterns on each side thereof, and a second set of substantially identical parallel fracture patterns extending across said member at an intersecting angle with said first set, the radiating cracks from each set of fracture patterns intersecting and dividing said abrasive bonding adhesive into extremely small islands still firmly adhered to said backing member thereby producing substantially equal flexibility of said backing member in all directions.

5. A method of flexing coated abrasives which comprises: applying an abrasive bond fracturing pressure to the back surface of a web having on its opposite surface a layer of abrasive grains adhesively bonded thereto, said pressure being applied along a set of narrow uninterrupted, sine-curve paths extending across said web, by substantially tangential contact with a plurality of rolling curved pressure applying members; and thereafter applying a further abrasive bond fracturing pressure by the same means to the back surface of said web along a second set of narrow uninterrupted sine-curve paths out of phase with respect to said first set of paths.

References Cited in the file of this patent
UNITED STATES PATENTS

| | | |
|---|---|---|
| 1,238,143 | Hodgkins | Aug. 28, 1917 |
| 1,647,475 | Seymour | Nov. 1, 1927 |
| 1,989,742 | Davis | Feb. 5, 1935 |